Oct. 15, 1963　　　G. H. JOHNSON ETAL　　　3,107,024
MATERIAL HANDLING CONTAINERS
Filed Nov. 10, 1960　　　　　　　　　　　　9 Sheets-Sheet 1

Oct. 15, 1963 G. H. JOHNSON ETAL 3,107,024
MATERIAL HANDLING CONTAINERS
Filed Nov. 10, 1960 9 Sheets-Sheet 3

Oct. 15, 1963  G. H. JOHNSON ETAL  3,107,024
MATERIAL HANDLING CONTAINERS
Filed Nov. 10, 1960  9 Sheets-Sheet 5

Oct. 15, 1963  G. H. JOHNSON ETAL  3,107,024
MATERIAL HANDLING CONTAINERS
Filed Nov. 10, 1960  9 Sheets-Sheet 6

United States Patent Office 3,107,024
Patented Oct. 15, 1963

3,107,024
MATERIAL HANDLING CONTAINERS
Gordon H. Johnson, Metairie, La. (13316 S. Bluefield Ave., La Mirada, Calif.), and Gerald T. O'Leary, New Orleans, La. (33—23 172nd St., Flushing 58, N.Y.)
Filed Nov. 10, 1960, Ser. No. 68,397
26 Claims. (Cl. 220—1.5)

The present invention relates to material handling containers for use in transporting or storing goods of many different kinds. The term "container" is used in a broad sense to include pallets, cribs, bins, baskets and both open and closed receptacles.

In accordance with the present invention there is provided a container which is demountable so that it can be "knocked down" so as to require minimum space when stored or shipped empty and is readily convertible for use in many different ways and under many different conditions. For example, it can be used as an open or closed shipping container, storage container, crib, basket, bin or pallet for transporting or storing material including bulk material, packaged goods and machines, or other equipment.

A container in accordance with the invention is of modular unitized construction comprising unit parts which can be readily assembled in different combinations to provide containers of different kinds for different purposes and can be readily disassembled for compact storage or shipment when empty, or partially disassembled for convenient access to the goods. The modular construction also facilitates repair of any container damaged in use. The unit parts of the container are readily disassembled to permit free access for repair. Alternatively, any damaged unit is readily replaceable by another. No tool is required for assembling and disassembling the parts other than a key for locking them in place and unlocking them for removal.

The unit parts of a container in accordance with the invention include an improved pallet, corner posts, side panels and top. The top and each of the side panels are individually removable to permit access to the goods from the top and from all four sides. When a container is used for a large piece of equipment, for example a machine, the equipment is mounted on the pallet and the corner posts, side panels and top are erected around it. The top and side panels lock in place when the container is assembled to provide complete security to the contents. If complete enclosure is not needed or desired one or more of the side panels is replaced by open X-bracing between the corner posts. There is also provided an open top frame interchangeable with the closed top.

The pallet, in accordance with the invention, provides uniform load distribution so that maximum loads can be carried with relatively lightweight construction. The container can be handled with a hoist or crane lifting the container by the corner posts or by a fork lift truck lifting the container by the pallet. The construction of the pallet permits entry of lifting forks from any of the four sides while protecting the pallet from damage by the forks. It, likewise, permits moving the container by rollers placed under the pallet.

Provision is made for stacking two or more complete containers on top of one another and holding them securely in alignment. Alternatively, one container can be stacked on top of another with the pallet of the upper container serving as the top of the lower container.

Containers in accordance with the invention are preferably constructed of extrusions and sheets of light metal such as aluminum or magnesium or light metal alloys to provide an economical lightweight construction. The lighter weight makes the containers easier to handle, whether empty or full, and easier to assemble and disassemble. Moreover, it reduces shipping charges.

Containers constructed of aluminum or magnesium or their alloys have the further advantage that no painting is required and the heat reflective properties of the light metal protect the contents of the container from extremes of temperature.

The construction, characteristics, objects and advantages of the invention will be more fully understood from the following description and claims in conjunction with the accompanying drawings in which:

A container in accordance with the invention illustrated by way of example in FIGS. 1 to 25 comprises a platform or pallet 1, four corner posts 3, a top 5 and four side panels 7. While containers in accordance with the invention can be made in various sizes according to the intended use, the embodiment illustrated in the drawings is a shipping container which is substantially cubical, being approximately 7½ feet square and 7 feet, 8 inches high.

Figure 9:
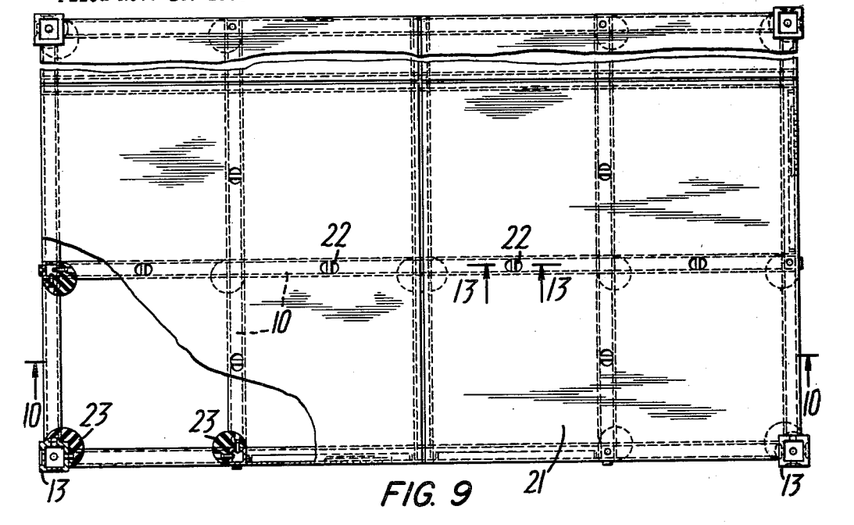
FIG. 9 is a partial plan of the pallet with portions of decking broken away to show the underneath construction.

The pallet 1 (FIGS. 1, 2, 9 and 10) comprises an upper grid 10 and a similar lower grid 11 each comprising intersecting structural members which are preferably tubular members of square cross section. A plurality of relatively short vertical members 12 extend between and connect the upper and lower grids 10 and 11. The vertical members 12 are shown as being located at each of the intersections of the tubular members forming the upper and lower grids and are preferably likewise tubes of square cross section. The members forming the upper and lower grids and the interconnecting vertical members 12 are all united, preferably by welding, to provide a unitary structure which is relatively rigid, yet sufficiently flexible to yield under high stress. At each corner of the pallet there is provided a vertically extending socket member 13 which is of square cross section and is hollow to provide an elongated upwardly opening socket 14 and a shorter downwardly opening socket 15 partially separated by an apertured partition 16. The upper and lower ends of the socket member 13 are substantially flush with the upper and lower faces of the pallet, but the socket member preferably projects laterally a small distance beyond the adjacent portions of the upper and lower grid members as seen in FIG. 9 so that the inside surfaces of the sockets are in alignment with the outer surfaces of the adjacent grid members. The socket members 13 are united with the upper and lower grid members preferably by welding. Vertically spaced holes 17 open from each of the outer faces of the socket member 13 into the upper socket 14 and corresponding directly opposite holes 17 extend through the opposite inner walls of the sockets. A hole 18 opens from each of the outer faces of the socket member 13 into the lower socket 15. A shallow recess 19 surrounds and extends between the outer ends of the holes 17. As will be explained below, the holes 17 and 18 receive locking means for securing corner posts to the pallet.

A floor or deck 21 overlies the upper grid 10 and is suitably secured thereto for example by bolts, screws, rivets or welding. The decking is preferably formed of metal plates of sufficient thickness to carry the intended load and is illustrated as comprising four sections. At suitably spaced points holes are cut through the decking and the upper wall of the underlying grid member to form cross bars 22 adapted to receive lines, hooks, or other devices for securing equipment or other load on the pallet.

Figure 1:
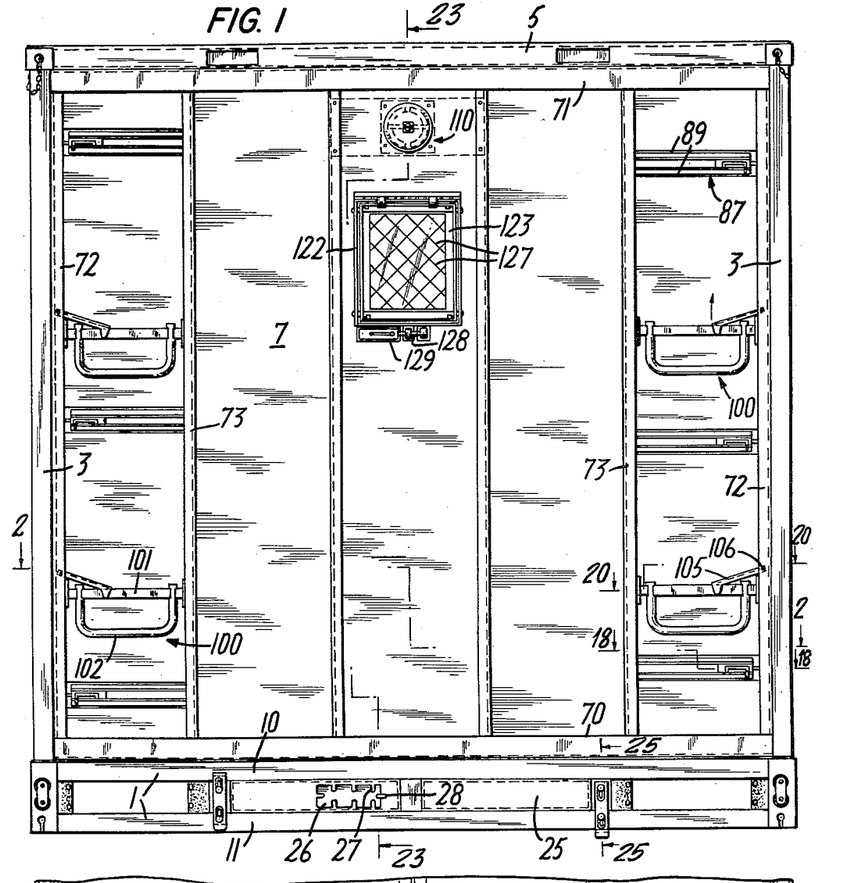
FIG. 1 is a side elevation of a container in accordance with the present invention.
Figure 2:
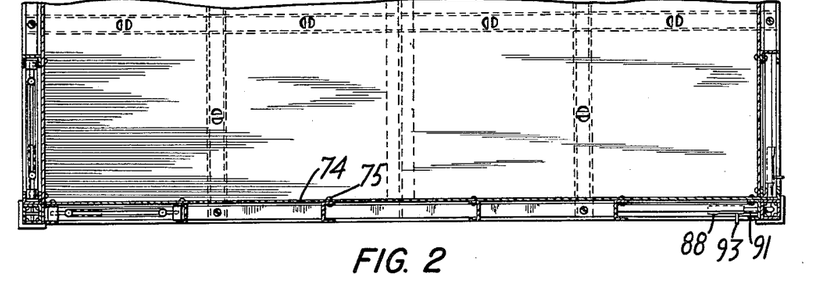
FIG. 2 is a partial horizontal section taken approximately on the line 2—2 in FIG. 1.
Figures 10, 11, 12, 13:
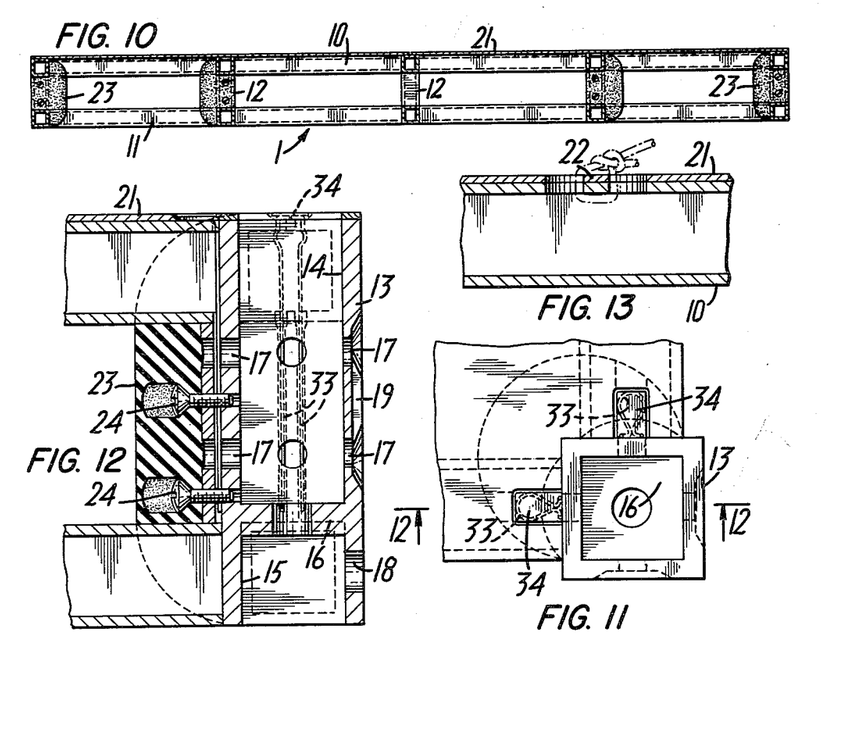
FIG. 10 is a side elevation of the pallet.
FIG. 11 is an enlargement of a portion of FIG. 9 showing one corner of the pallet.
FIG. 12 is a section taken approximately on the line 12—12 of FIG. 11.
FIG. 13 is an enlarged section taken approximately on the line 13—13 in FIG. 9 and showing means for securing equipment or other goods on the pallet.
Figures 23, 24, 25:
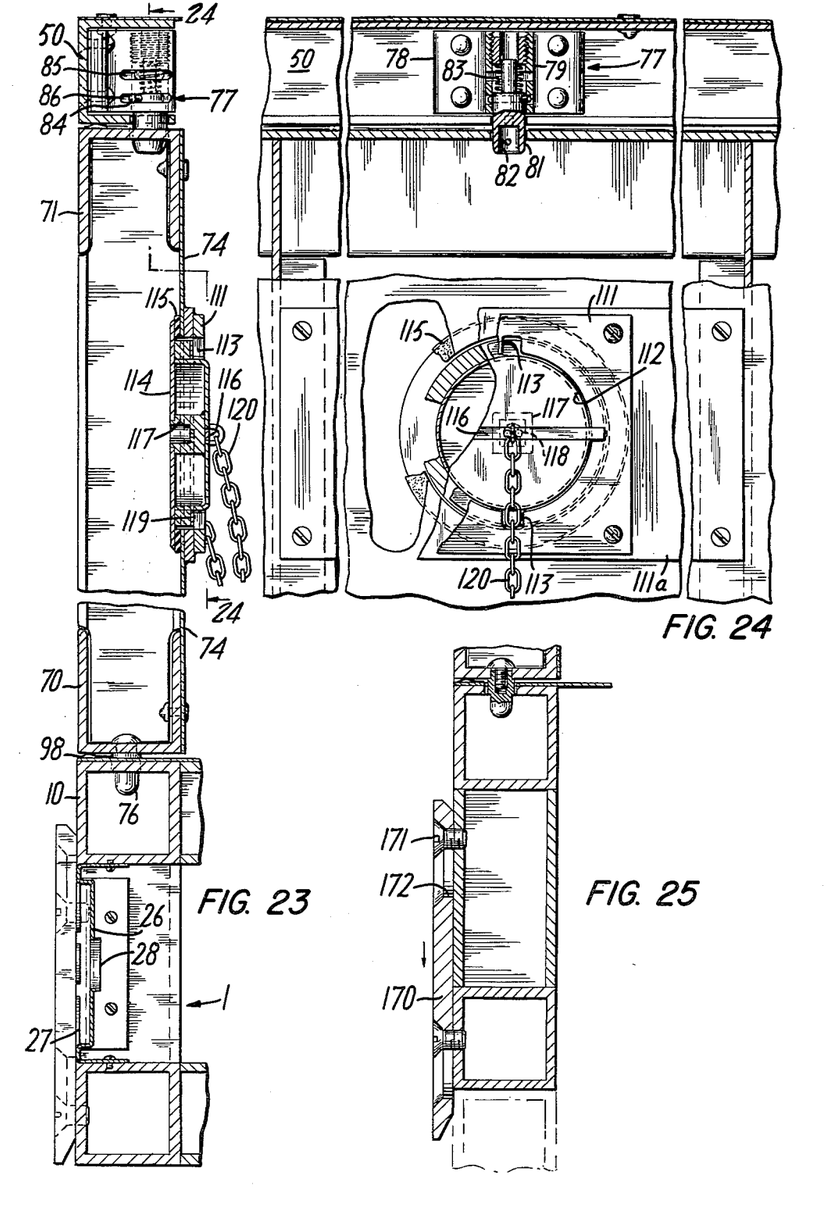
FIG. 23 is an enlarged vertical section taken approximately on the line 23—23 in FIG. 1.
FIG. 24 is a view partially in elevation and partially in section taken approximately on the line 24—24 in FIG. 23.
FIG. 25 is an enlarged section taken approximately on the line 25—25 in FIG. 1 and showing means for holding containers in alignment with one another when stacked.

The upper and lower grids 10 and 11 are spaced sufficiently by the vertical members 12 to receive the forks of a fork lift truck between them. Arcuate rubber bumpers 23 are secured on the inner faces of the socket members 13 and on selected ones of the vertical members 12 as illustrated in FIGS. 9, 10 and 12, for example by screws 24, to protect these members against any damage by the forks. Vertical metal plates or panels 25 extend between the upper and lower grids at each side of the pallet to block off a central portion of each side while leaving open the portion between the socket member 13 and next adjacent vertical member 12 to assure that the container is substantially centered on the fork when being handled by a fork lift truck. On at least one of the panels 25 there is provided a shipping tag or document holder formed by depressing a rectangular area 26 of the panel while stamping out a plurality of fingers 27 which are left in the original plane of the panel (FIGS. 1 and 23). At one end of the rectangular depressed area 27 there is provided a small area 28 which is further depressed. A tag or other document is held by being slipped into the space between the depressed area 26 and the fingers 27. The small depressed area 28 provides finger room to grip the end of the tag when inserting or withdrawing it. The panels 25 are suitably secured in place, for example by screws or spot welding.

Figure 14:
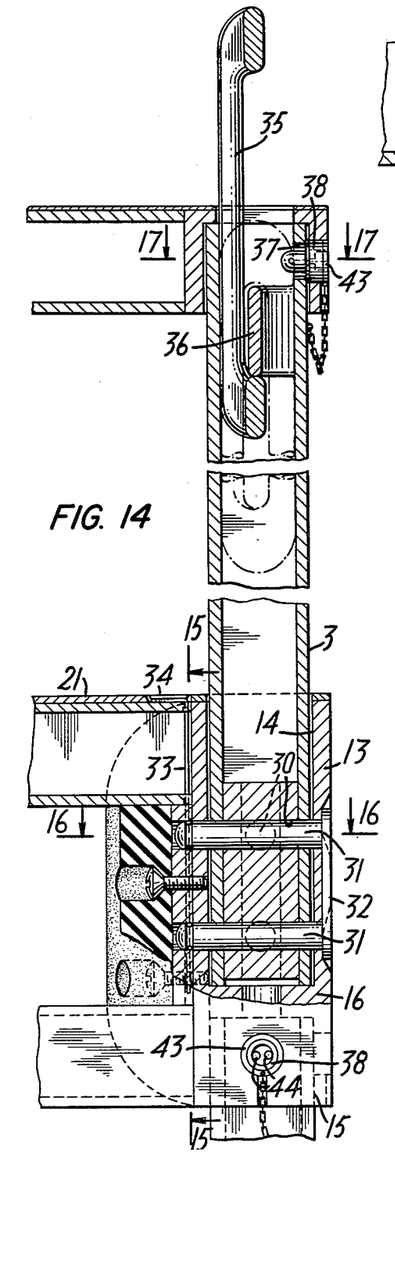
FIG. 14 is an enlarged vertical section of one of the corner posts together with adjacent portions of the pallet and top and showing a lifting link for lifting the container.
Figure 15:
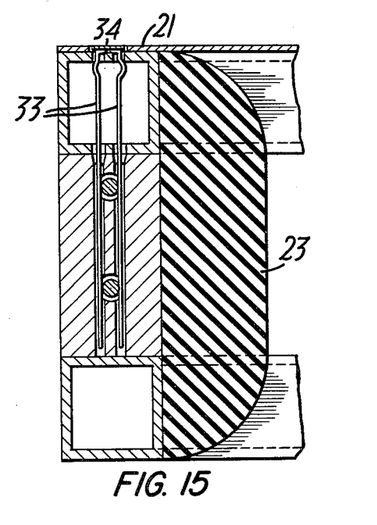
FIGS. 15, 16 and 17 are sections taken respectively on the lines 15—15, 16—16 and 17—17 in FIG. 14.
Figure 16:
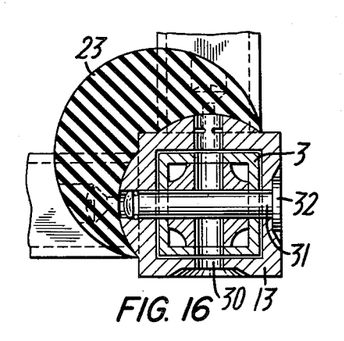

The four corner posts 3 are preferably identical and are tubular members of square cross section of such size as to fit snugly in the sockets 14 of the socket members 13 of the pallet, as illustrated in FIG. 14. Each post is provided with vertically spaced transverse holes 30 which are positioned so as to be aligned with the holes 17 of the socket member 13 when the lower end of the post is resting on the partition 16. Bolts or pins 31 are inserted through the aligned holes 17 and 30 to secure the posts 3 in the socket. Preferably holes 30 are provided in all four walls of the posts 3 so that pins 31 can be inserted from either of side face of the socket member but only two pins are required as illustrated in FIG. 14. The two pins 31 are preferably connected or "ganged" by a strap 32 which seats in the recess 19 (FIG. 12) so as to be flush with the outer face of the socket member. The pins 31 are releasably secured in position by a hairpin shaped spring wire clip 33 (FIGS. 14 and 15) which is inserted in a space provided on the inner face of the socket member and engages annular grooves provided in the inner end portions of the pins. A head portion 34 of the spring clip is bent over at right angles to the leg portions and is received in a space provided by cutting out a small portion of the decking 21.

Figure 17:
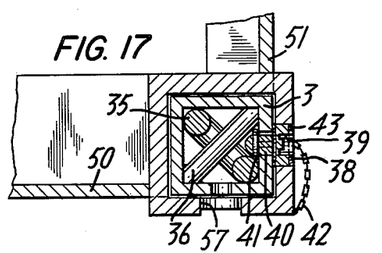

At its upper end each post 3 is provided with an elongated lifting link 35 which is positioned diagonally of the post as illustrated in FIG. 17. The link is retained by a strut 36 which extends through the link and is welded at its ends to opposite corner portions of the post. The length of the link 35 and the position of the retaining strut 36 are selected so that the link is movable longitudinally from an operative position in which it extends up above the end of the post 3 as shown in solid lines in FIG. 14 and a retracted position in which the link is received inside the post with its upper end substantially flush with the upper end of the post as illustrated in broken lines.

In at least one of the walls of the post 3 there is provided a keyhole 37 near the upper end of the post. Preferably such holes are provided in two of the four walls of the post. As will be explained more fully below, a locking pin 38 is received in one of the holes 37 to secure the top of the container in place. The locking member 38 has a head portion provided with a socket 39 to receive a key, a shank portion 40 which fits in the hole 37 and a pin 41 extending transversely of the shank portion at its inner end. The keyhole 37 is circular and of a size to receive the shank portion of the locking member with diametrically opposite wings or notches to permit the ends of the transverse pin 41 to pass through. The locking member is locked in place by rotating it, for example 90 degrees, to move the ends of the pin 41 out of registry with the notches. The locking member 38 is shown attached to the post by short length of chain 42 so that it cannot be lost. The chain 42 is secured to the head portion of the locking member 38 by a ring 43 which permits rotation of the locking member. As will be seen in the lower portion of FIG. 14, two small holes 44 in the bottom of the socket 39 are adapted to receive correspondingly spaced pegs on the end of a suitable tool or key for rotation of the locking member.

Figure 3:
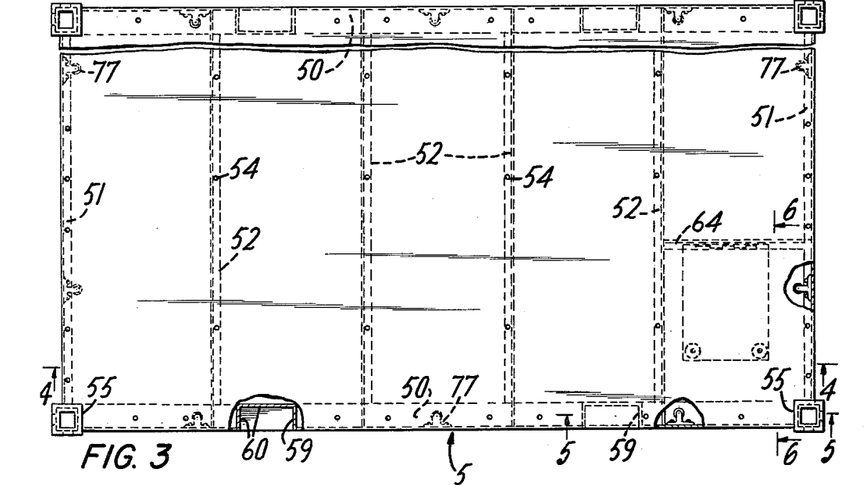
FIG. 3 is a partial top plan view.
Figure 4:
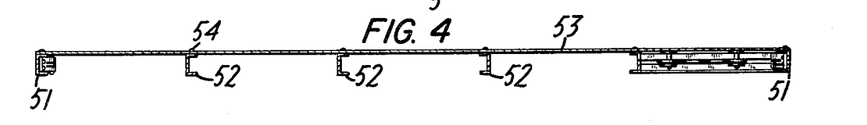
FIG. 4 is a section of the top only taken approximately on the line 4—4 in FIG. 3.
Figure 5:
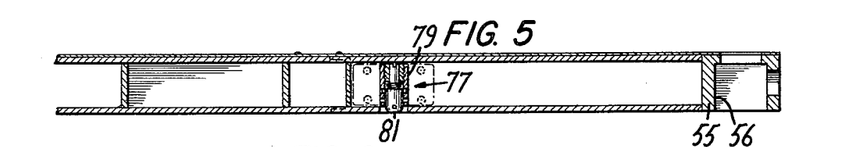
FIG. 5 is an enlarged section taken approximately on the line 5—5 in FIG. 3.
Figure 6:
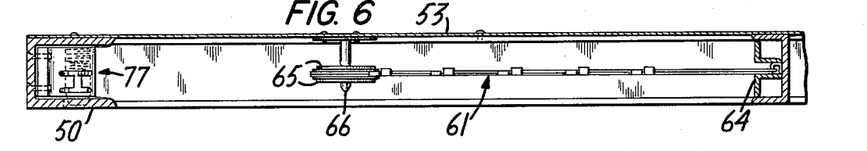
FIG. 6 is an enlarged section taken approximately on the line 6—6 in FIG. 3 showing details of a document holder.

The top 5 is shown as comprising a square frame formed of endwardly facing channel members 50 and 51 and a plurality of transverse channel members 52 extending between the opposite channel members 50. The frame members are united, preferably by welding, to provide a unit construction. A skin 53 preferably formed of sheet metal overlies the frame and is secured thereto, for example by rivets 54. At each corner of the top there is provided a socket member 55 (FIGS. 3, 5 and 16) which is united with the frame members of the top, for example by welding. The member 55 is of square cross section and hollow to provide a downwardly opening socket 56. The upper end of the socket member is also open with an opening about the same size as the inside of the posts 3 to permit the links 35 to come up through the socket members. The upper and lower ends of the socket member 55 are substantially flush with the adjacent portions of the top, but the outer side walls of the socket member project laterally as seen in FIGS. 3 and 17 so that the inner surfaces of the sockets are substantially in alignment with the outer surfaces of the frame members 50 and 51. The socket 56 is of a size and shape to receive snugly the upper end of a corner post 3. In each of the outer walls of the socket member 55 there is provided an opening 57 positioned so as to be aligned with the holes 37 in the upper end portion of the post 3. The holes 57 are of a size to fit the head portions of the locking members 38. The top 5 of the container is positioned on the four corner posts with the upper end portions of the posts received in the sockets 56 and at least one locking member 38 is inserted into the holes 57 and 37 and locked in place as illustrated in FIG. 17 so as to lock the top in position. It will be seen that the outer end of the locking members 38 are substantially flush with the outer surface of the socket member 55. A recess 58 extends downwardly from the hole 57 and is adapted to receive the chain 42 of the locking member so that nothing projects out beyond the outer face of the socket member 55.

The top 5 is provided with handle portions 59 to facilitate assembly and removal of the top. These handle portions are formed by cutting openings in the web portions of the channels 50 and welding in plates 60 between the flanges of the channels. As shown in FIGS. 3 and 17, channel 50 are of heavier section, being provided with wider flanges than channels 51 and 52.

Figure 7:
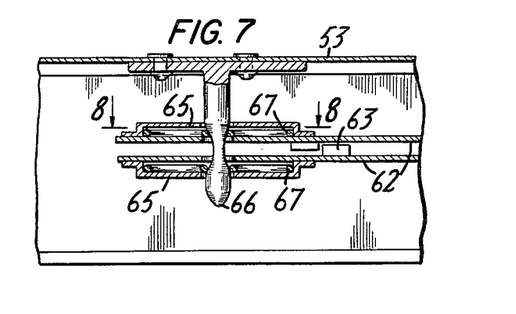
FIG. 7 is a further enlargement of a portion of FIG. 6.
Figure 8:
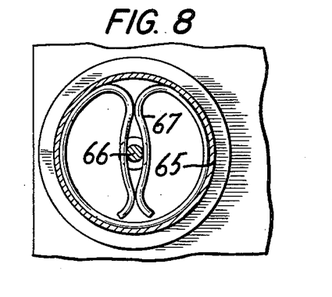
FIG. 8 is a section taken approximately on the line 8—8 of FIG. 7.

A document holder 61 is provided on the underside of the top 5 as illustrated in FIGS. 3 to 8. The document holder is shown as comprising two rectangular plates 62 having spaced inwardly turned tabs 63 on opposite edges. A bill of lading or other document is placed between the two plates 62 and is retained by the tabs 53. One end of the assembled plates is received in a channel structure 64 which is shown as extending across between one of the channel members 51 of the top and the next succeeding channel member 52 (FIG. 3). The other end of each of the plates is provided with spaced holes aligned with snap fasteners 65 which are secured to the plate and receive studs 66 projecting downwardly from the skin 53 of the top. Each of the snap fasteners 65 comprises a spring 67 of the shape shown in FIG. 8 having portions adapted to engage a reduced portion of the stud 66 (FIG. 7). After one end of the assembled plates 62 is inserted in the channel structure 64, the other end is pressed upwardly so that the studs 66 enter and engage the snap fasteners 65 to hold the plates in place. There is thus provided a simple and convenient document holder.

Each of the sides 7 has a frame comprising a lower channel member 70, an upper channel member 71, side channels 72, and a plurality of vertical channel members 73 extending between the upper and lower channel members. The channel members of the frame are united, for example by welding, into a unitary structure. A skin 74, preferably formed of sheet metal, is secured to the inner flanges of the channel members of the frame, for example by rivets 75. The side 7 is approximately square and is of a size to fit snugly between the pallet and top of the container and between the corner posts 3. The four sides of the container are interchangeable with one another and, with the possible exception of certain accessories, are identical.

Means is provided for releasably locking each of the sides 7 in place. At its lower edge each side is provided with two or more studs 76 (FIG. 23) which are mounted on the downwardly facing web portion of the lower channel member 70 and extend down into holes in the upper grid 10 of the pallet 1. At the upper edge of the side 7, the upwardly facing web portion of the upper channel 71 is provided with two or more holes to receive key operated locking devices 77 mounted in the channel frame members of the top 5, (FIG. 23). Each of the locking devices comprises a body portion 78 which is shown riveted to the web of the channels 50, 51 and having a vertically extending cylindrical barrel portion 79 in which a bolt 81 is vertically slidable and also rotatable. The lower portion of the bolt 81 is enlarged to provide a head in which there is provided a downwardly opening socket 82 adapted to receive the same key that is used for the locking devices 38 (FIG. 17) described above. A spring 83 acts on the bolt 81 to push it downwardly. A pin 84 extending transversely of the bolt 81 has projecting end portions engageable selectively with spaced circumferential grooves 85 and 86 formed in the inner surface of the cylindrical guide portion 79 of the body and connected by a longitudinal channel or groove which permits the pin 84 to move between grooves 85 and 86 and to be locked in one or the other by rotation of the bolt 81. The positions of the grooves 85 and 86 correspond respectively to a retracted position of the bolt 81 in which its lower end is substantially flush with the lower surface of the channels 50, 51 and a locking position in which the bolt 81 extends down into the aligned hole in the upper channel 71 of the side 7 to lock the side in place. When the bolt 81 is held in retracted position by engagement of the pin 84 in the groove 85 of the barrel portion 79, it is "locked" by inserting a key in the socket 82 and turning the bolt 81 until the pin 84 coincides with the vertical channel connecting grooves 85 and 86. The bolt is then moved downwardly by the spring 83. It is then locked in locking position by rotation with the key to bring the ends of the pin 84 into the lower groove 86.

Figure 18:
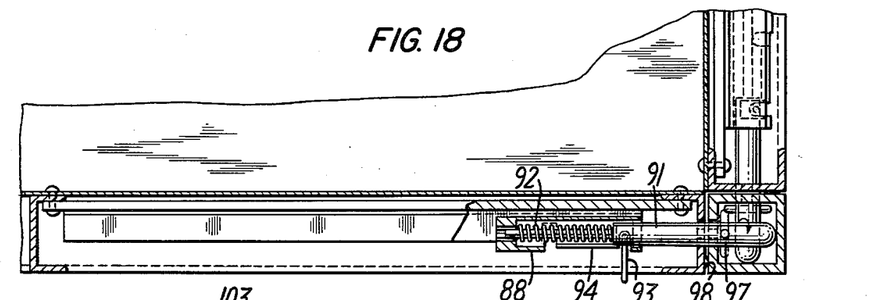
FIG. 18 is an enlarged section taken approximately on the line 18—18 in FIG. 1 and showing details of means for locking the side panels to the corner posts.
Figure 19:
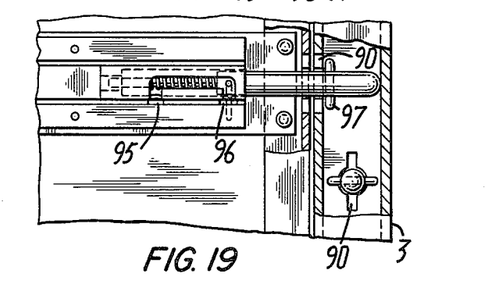
FIG. 19 is an elevation partially in section showing the locking means.

Means is also provided for locking the side edges of the side panel 7 to the vertical posts 3. As illustrated in FIGS. 1, 18 and 19 there are provided six locking devices 87 on each side panel. Each of the locking devices 87 comprises a barrel portion 88 mounted on channel members 89 extending horizontally between the side channel 72 and the next vertical channel 73 of the side panel. A bolt 91 is rotatable and longitudinally slidable in the barrel 88 between a retracted position in which the end of the bolt is substantially flush with the outer face of the side channel 72 and a locking position in which the bolt 91 extends into an aligned keyhole 90 in the corner post 3. A compression spring 92 surrounding a reduced tail portion of the bolt 91 tends to move the bolt from retracted to locking position. A bar 93 projects radially from the bolt 91 and is slidable in a groove 94 which extends longitudinally of the barrel and has at its opposite ends circumferentially extending portions 95 and 96 corresponding respectively to the positions of the rod 93 when the bolt 91 is in retracted and locking position. The rod 93 thus serves as a handle for moving the bolt 91 from one position to the other and locking it in the selected position. The holes 90 in the posts 3 for receiving the bolts 91 are circular with a diameter to receive the bolt and with diametrically opposite notches or wing portions to receive the ends of a pin 97 that extends transversely of the bolt at a position so as to be just inside the wall of the corner post 3 as illustrated in FIG. 19 when the bolt is in locking position. The wing portions of the hole 90 are vertical and the pin 97 is also vertical when the bar 93 is in the longitudinal portion of the groove 94 so that the pin 97 passes through the hole 90 into the interior of the center post 3. When the bolt 91 is rotated to bring the bar 93 into the circumferential portion 96 of the groove, the pin 97 is turned so that it no longer registers with the wing portions of the hole 90 and hence locks the side panel 7 tightly to the corner post. The locking devices 87 at opposite sides of the side panel 7 are vertically offset relative to one another as seen in FIG. 1. This permits offsetting the holes 90 in the corner posts 3 as illustrated in FIG. 19 to minimize locally weakening the corner posts while at the same time providing complete interchangeability of the four side panels of the container.

The outer faces of the channel frame members 70, 71 and 72 of the side panel 7 are flush with the outer faces of the pallet, top and corner posts respectively as seen in FIGS. 23 and 18. The parts of the container fit together accurately to provide tight joints between them. Moreover, resilient weather stripping 98 is shown provided to increase still further the tightness of the joints.

Figures 20, 22:
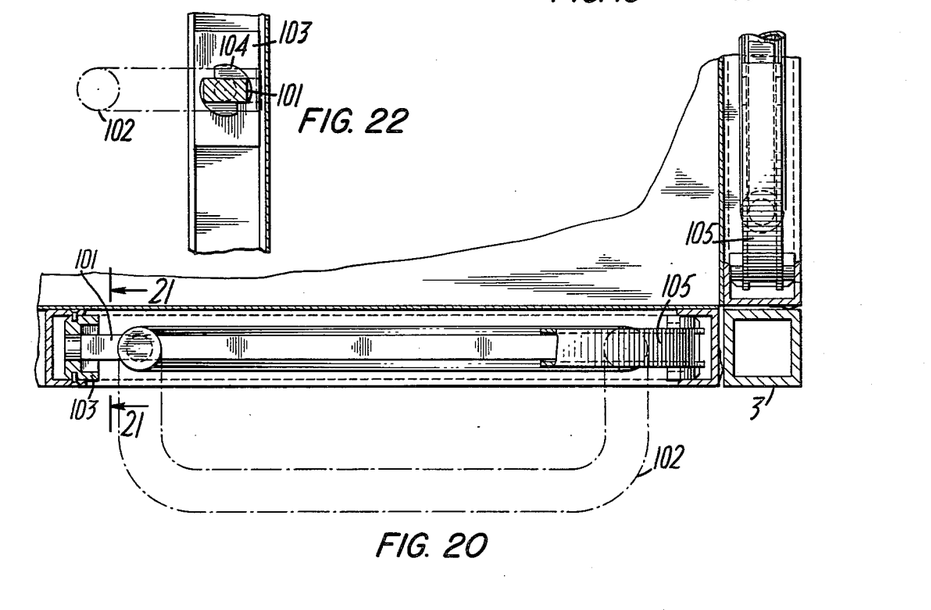
FIG. 20 is an enlarged section taken approximately on the line 20—20 in FIG. 1 and showing a handle for holding the side panel when being inserted or removed.
FIG. 22 is a view similar to FIG. 21, but showing the handle in another position.
Figure 21:
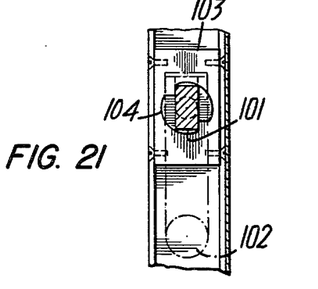
FIG. 21 is a sectional view taken approximately on the line 21—21 in FIG. 20 and showing means permitting limited movement of the handle between an operative and a retracted position.

The side panels 7 are provided with handles 100 for convenience of handling the panel when installing or removing it. As illustrated in FIGS. 1, 20, 21 and 22 the handles are retractable so as to swing from a projecting operative position to a retracted position in which they do not project beyond the outer faces of the channels 72 and 73 of the side panels. Each of the handles 100 is shown as comprising a rectangular bar 101 and a U-shaped hand grip portion 102 united rigidly with the bar, for example by welding. End portions of the bar 101 project beyond the hand grip portion 102 and are received in bearing blocks 103 mounted respectively on the side channels 72 and the next adjacent vertical channel 73 of the side panel (FIG. 1). Each of the bearing blocks 103 is provided with a hole which is seen in FIGS. 21 and 22 and is double sector shaped so as to permit rotation of the rectangular bar 101 through an angle of approximately 90 degrees. The handle is thereby permitted to rotate from a retracted position shown in FIG. 21 to an operative position shown in FIG. 22. A retaining latch 105 pivotally mounted on the channel 72 at 106 has a bifurcated end which straddles the bar 101 when the handle is in retracted position and thereby holds the handle in that position.

At least one of the side panels 7 is preferably provided with a port hole 110 as illustrated in FIGS. 1, 23 and 24. A frame 111 mounted on a reinforcing strip 111a extending between adjacent channels of the side panel, for example by rivets, is provided with a hole 112 which is concentric with, but of smaller diameter than, holes formed in the strip 111a and the skin 74 and is circular except for diametrically opposite notches or wing portions 113. A circular closure member 114 fits into the hole 112 and has a projecting rim portion which overlies an annular portion of the frame and skin surrounding the hole and is provided with an annular gasket 115 to provide a tight seal. As shown in FIG. 23, the closure is double-walled. A bar 116 extends diametrically of the closure member and at its center there is a socket member 117 provided with a central socket 118 to receive a key of the same kind as used for the locking devices 38 and 77. The ends of the bar 116 are adapted to pass through the wing portions 113 of the hole 112 when the closure 114 is inserted in the hole. The closure is then turned approximately 90 degrees by means of a key inserted in the socket 118 to bring the end portions of the bar 116 behind portions of the frame so as to lock the closure securely in position. A spring washer 119 helps keep the closure tight. A chain 120 is attached to the closure 114 and a portion of the frame to prevent loss of the closure when it is removed from the opening.

On the outer face of at least one of the side panels 7 there is preferably provided means for holding a document so that it is visible and is yet sealed so as to be fully protected from the weather. As shown in FIGS. 1, 32 and 33 and 34 the document holder comprises an inner frame 121 having an outwardly projecting flange portion 122 and an outer frame 123 having an outwardly projecting flange portion 124. The inner frame is hingedly mounted on the side panel by a piano hinge 125. A rubber gasket 126 is bonded on the inner face of the inner frame and provides a seal between the frame and side panel. The frame is rectangular with the central portion open and a grid of crossing wires 127 extends across the opening. At the side opposite the hinge 125, the inner frame is provided with a latch comprising a latch bar 128 slidable in spaced guides 129 and 129a mounted on the side panel, for example by welding, and engaging a projecting latch portion 130 on the inner frame 121. A hole 131 in the latch bar 128 is engageable through an elongated slot 132 in the guide 129 so that the bolt can be slid from unlocked to locked position by a key or other instrument inserted in the hole. A sealing wire 133 passing through another hole in the bar 128 when in locked position prevents unauthorized opening of the frame without detection.

Figures 32, 33, 34:
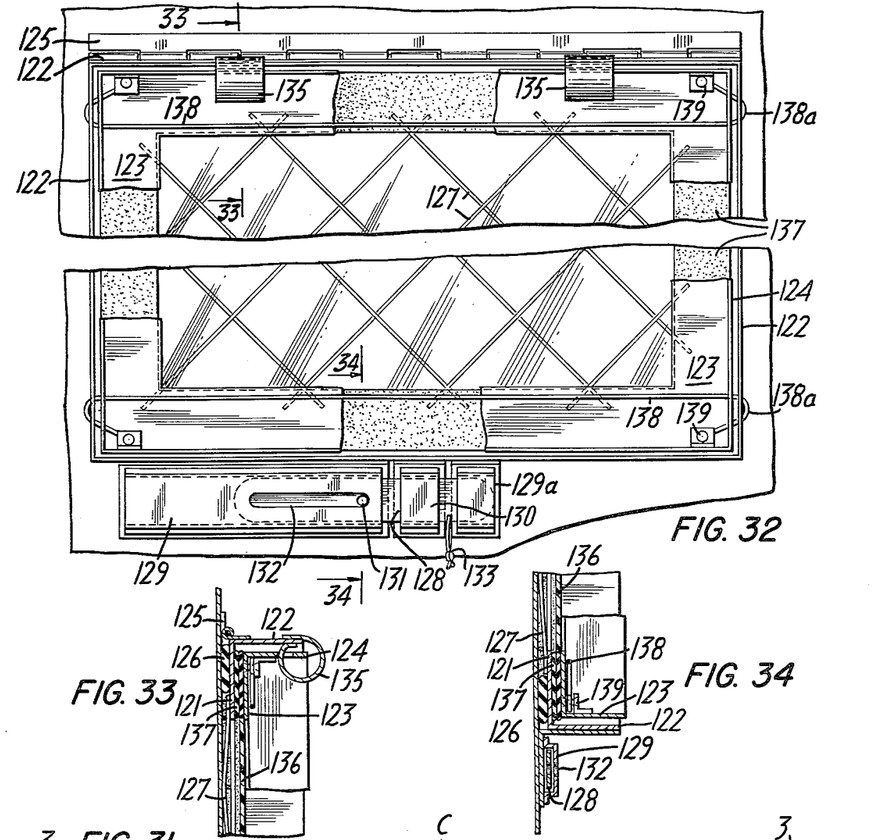
FIG. 32 is an enlargement of a portion of FIG. 1 showing in more detail an exterior document holder, portions being broken away to show underlying construction.
FIGS. 33 and 34 are sections taken approximately on the lines 33—33 and 34—34 respectively in FIG. 32.

The outer frame 123 is slightly smaller than the inner frame so as to nest inside the outwardly projecting flange 122 and is loosely hinged to the inner frame by means of leaf hinges 135 which pass through suitable apertures in the outwardly projecting flange portion 124 at one side of the frame. A sheet or plate of transparent material 136 is sandwiched between the inner and outer frames and is engaged on opposite faces by peripheral rubber gaskets 137 bonded respectively on the outer face of the inner frame and the inner face of the outer frame to provide a fluid-tight seal. The outer frame is releasably held and is resiliently pressed in toward the inner frame by spring rods 138 which are secured to the outer frame by clips 139 and have bow portions 138a which pass through slots in the flange portions of the inner and outer frames to hold the frames together. A shipping or other document placed between the side panel of the container and the inner frame 121 is thus visible through the plastic sheet 136 and the wire grid 127 while being protected from the weather and also protected against removal.

Figure 26:
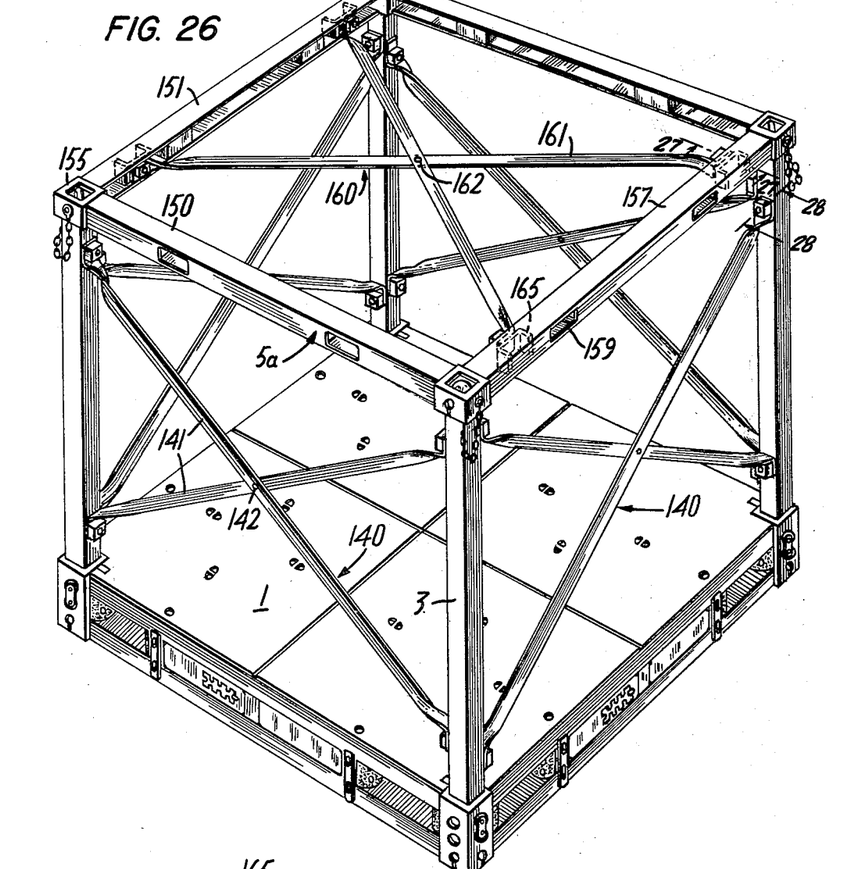
FIG. 26 is a perspective view showing a container in accordance with the invention having selected units assembled to provide open sides and top.

In FIG. 26 there is illustrated an open type container in accordance with the invention for use when a closed container is not desired. The pallet 1 and corner posts 3 are the same as illustrated in FIGS. 1 to 25 and described above and are assembled in like manner. However, in place of closed side panels there are X-frame structures 140 between the corner posts. Each of the X-frames consist of two bars, tubes, channels or other structural members pivotally connected at approximately their midpoints by a pivot pin 142. At the opposite ends of each of the bars there is provided means for securing the bars to the corner posts 3, using the same keyholes 90 (FIG. 19) that are used in securing the closed side panels when used. The securing means comprises a block 143 welded to the end portion of the bar and having a cylindrical bore in which a stud 144 is rotatable and longitudinally slidable. At its outer end the stud is provided with a head 145 in which there is formed a socket 146 adapted to receive the same key that is used for other locking devices of the container. A transverse pin 147 on the stud 144 has projecting ends adapted to pass through the keyhole 90 and then lock inside the post 3 when the stud is turned. A small transverse pin 148 near the head of the stud works in a double sector recess formed in the block 143 to limit rotation of the stud to approximately 90 degrees. A spring washer 149 is interposed between the head of the stud and a recessed portion of the block 143. The ends of the bars 141 are thus securely locked to the corner posts 3 by inserting the inner ends of the studs 144 through the keyholes 90 in the posts and then turning the studs by means of a key inserted in the socket 146 while, at the same time, pressing inwardly to lock the studs in place. When the X-frame is removed, the two frame portions 141 pivot about the pivot pin 142 into parallel relationship so as to occupy minimum space and facilitate handling.

Figure 27:
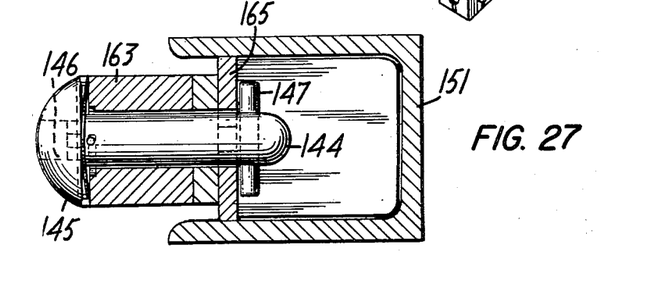
FIG. 27 is an enlarged section taken approximately on the line 27—27 in FIG. 6 and showing means for locking one end of X-bracing to a side channel of the top.
Figures 28, 29:
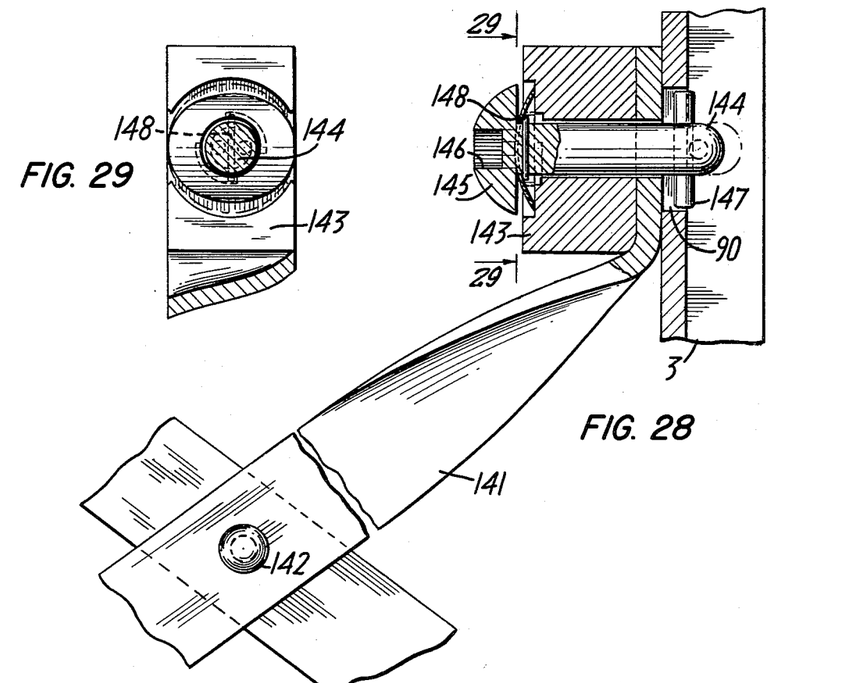
FIG. 28 is a fragmentary enlarged view partially in elevation and partially in section taken approximately on the line 28—28 of FIG. 6 and showing means for locking one end of X-bracing to a corner post.
FIG. 29 is a section taken approximately on the line 29—29 in FIG. 28.

The top of the container shown in FIG. 26 is also open and comprises an open frame 5a. The frame is made up of channel members 150 and 151 and corner socket members 155 which are similar to the corresponding parts 50, 51 and 55 shown in FIGS. 3 to 5, except that all four channels are preferably of equal weight. The frame is similarly provided with hand grips 159. The top further comprises an X-frame 160 similar to the X-frames 140 of the sides and comprising two bars or other structural members 161 pivotally connected together at 162. Blocks 163 welded on the end portions of the bars 161 are provided to receive studs 144 which are like those used for locking X-frames 140 to the corner posts. The inner ends of the studs 144 extend through keyholes provided in web members 165 welded in between the flanges of the channel 151 (FIG. 27). The X-frame 160 is thus demountably locked in the frame 5a in the same manner as the X-frames 140 are locked to the corner posts. Moreover, the frame 5a as a whole is locked on the corner posts in the same manner as described above with reference to the closed top 5.

Figure 30:
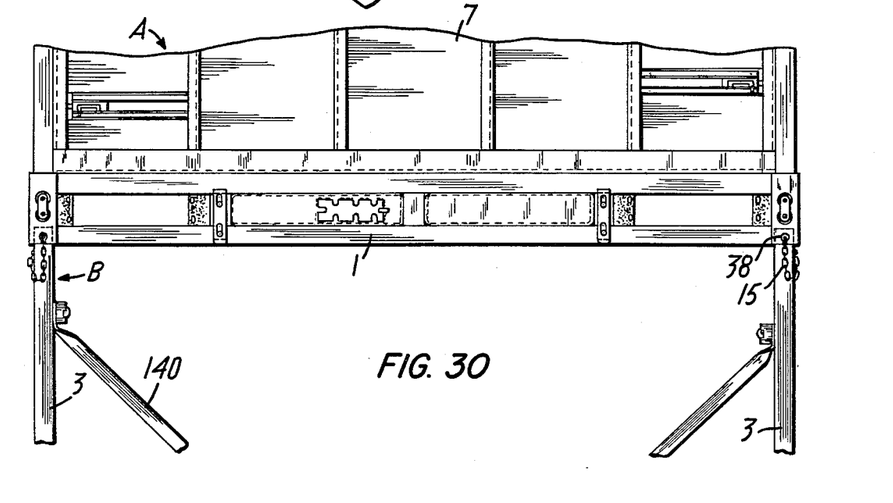
FIG. 30 is a partial side elevation showing a pallet of an upper container mounted directly on the corner posts of a lower container.

Two or more containers in accordance with the invention can be stacked on top of one another and means is provided for holding them in vertical alignment when stacked. As illustrated in FIG. 30 a closed container A in accordance with the invention is stacked on top of an open container B comprising a pallet (not shown) corner posts 3 and X-bracing 140, but not having a top. The pallet 1 of the upper container A sets directly on the corner posts 3 of the lower container B, the posts 3 of the lower container being received in the lower socket 15 of the pallet of the upper container (see also FIG. 14) and locked in place by locking devices 38.

Figure 31:
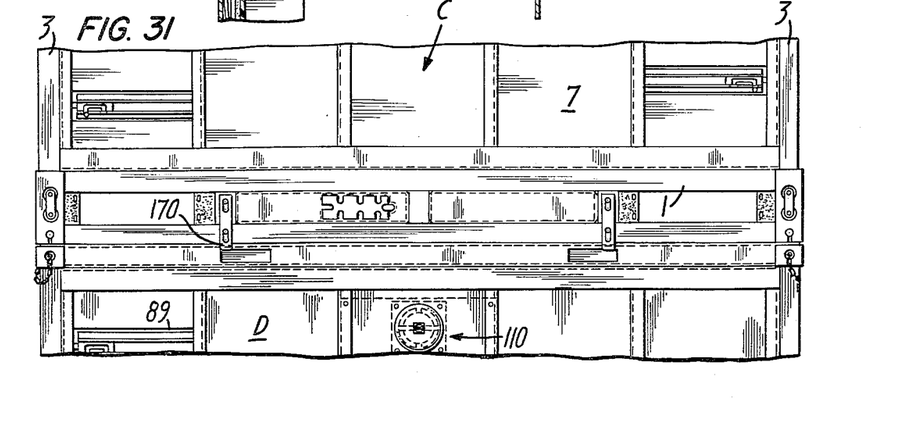
FIG. 31 is a similar view showing one complete container stacked on another complete container with means for holding the two containers in vertical alignment.

In FIG. 31 there is shown a closed container C comprising a pallet 1, corner posts 3, sides 7 and top (not shown) stacked on top of a closed container comprising a pallet (not shown), corner posts 3, closed side 7 and a top 5. The stacked containers are held in alignment with one another by aligning bars 170 (FIG. 25) which are mounted on the sides of the pallet 1 by means of screws 171 extending through elongated holes 172 in the bar so that the bars are longitudinally slidable from a retracted position in which the lower end of the bar is substantially flush with the bottom of the pallet and an operative position in which the bars extend downwardly and engage the side edges of the top of the lower container to hold the two containers in alignment.

The containers in accordance with the present invention are preferably made of light metal such as aluminum or magnesium or light metal alloys. The structural members such as tubes and channels are preferably extrusions while the decking and the skin of the sides and top panels are of sheet or plate. The use of light metal not only decreases the weight of the containers so as to reduce shipping charges both when empty and when full and make the containers easier to assemble, disassemble and handle, but has the added advantage that no painting is required. Moreover, the reflective characteristics of the metal reduces the transmission of heat and thereby protects the contents of the container from extremes of temperature.

Containers in accordance with the invention are easily and quickly assembled and disassembled without tools except for a special key fitting the locking devices. When the containers are assembled, the sides and top are securely locked in place so as to protect the contents of the container from unauthorized persons. When the containers are disassembled, the corner posts, side panels and the top are preferably stacked and banded on top of the pallet so that the empty containers are very compact for shipping or storing.

The assembled containers are easily handled either by a fork lift truck, the forks of which enter between the upper and lower grids of the pallet, or by a crane or hoist hooked onto the links 35 at the upper ends of the corner posts 3. The pallet construction assures distribution of the load rather than local concentration. By reason of the pallet construction, the container can also be moved on rollers placed under the lower grid.

When loading the containers, three sides and the top can be assembled on the pallet, the other side being left open to provide a wide door. Alternatively, the top can be left off so that the load can be lowered onto the pallet from the top, or a load such as a large piece of equipment can be secured on the pallet and the container erected around it. It will further be seen that the demountability and interchangeability of the parts makes it possible to use the elements of the container in many different combinations for different purposes.

While preferred embodiments of the invention have been illustrated in the drawings and particularly described, it will be understood that the invention is in no way limited to these embodiments.

What we claim and desire to secure by Letters Patent is:

1. In a material handling container, a rectangular pallet comprising a load-supporting platform, supporting members extending downwardly from said platform to support said platform in spaced relation to a supporting surface and means defining upwardly opening vertical sockets at the corners of said pallet, corner posts having lower end portions fitting into said sockets, releasable load-carrying connections between said posts and sockets for lifting by said posts said platform and a load supported thereon, side members extending between pairs of said posts, first locking means releasably securing said side members to said posts, a top member having sockets fitting over the upper ends of said posts and second locking means releasably securing said top member to said posts.

2. A container according to claim 1, in which said pallet comprises an upper grid of intersecting structural elements, a similar lower grid, vertical members extending between and connecting said grids at the intersections of said members and a deck carried by said upper grid.

3. A container according to claim 2, in which said vertical members include tubular members of rectangular cross section which are disposed at the corners of said pallet and define said sockets.

4. A container according to claim 2, further comprising vertical panels extending between said upper and lower grids at each side of said pallet, each of said panels having a length less than that of the side of the pallet and being located centrally of said side to cooperate with said grids and vertical members to define two laterally spaced spaces for the entry of forks of a lift truck.

5. A container according to claim 4, further comprising means on at least one of said panels for holding documents.

6. A container according to claim 4, further comprising bumper means mounted on at least those vertical members at the corners of said pallet and protecting said vertical member from the forks of a lift truck.

7. A container according to claim 1, in which said load carrying connections comprise transverse pins extending through aligned holes in said corner posts and said sockets.

8. A container according to claim 7, further comprising catch means retaining said pins in said holes.

9. A container according to claim 1, in which said side members comprise side panels each comprising an upper channel member, a lower channel member, a plurality of spaced vertical channel members extending between said upper and lower channel members including two at the side edges of the panel and a skin secured to the inner faces of said channel members.

10. A container according to claim 9, further comprising bolt means releasably locking said side panel to said pallet and said top member.

11. A container according to claim 9, further comprising a plurality of handles each comprising a U-shaped handle member rotatably supported between two adjacent vertical channel members of said side panel and means limiting rotation of said handle member from an inoperative position in which it lies against said skin and an operative position in which it projects outwardly from said side panel.

12. A container according to claim 11, further comprising means releasably securing said handle in inoperative position.

13. A container according to claim 9, further comprising a document holder mounted on the exterior of said skin between two of said spaced vertical channel members.

14. A container according to claim 13, in which said document holder comprises an inner frame, means hingedly attaching said inner frame to said skin, an outer frame, means hingedly attaching said outer frame to said inner frame, a sheet of transparent material between said frames, gasket means between a peripheral portion of said transparent sheet and each of said frames and between said inner frame and said skin and spring means pressing said outer frame toward said skin.

15. A container according to claim 1, in which said side members comprise X-frames extending between and releasably secured to said corner posts, each of said X-frames comprising two structural members crossing one another and pivotally secured together at the point of crossing.

16. A container according to claim 1, in which said first locking means comprises bolts mounted on said side members for rotation and longitudinal sliding movement, each of said bolts having on an end portion a lateral projection, means defining a key hole in said corner post in position to receive said end portion of said bolt including said projection and means defining a detent to hold said bolt against withdrawal when turned to bring said projection into engagement with said detent.

17. A container according to claim 1, in which said top member comprises a rectangular frame of channel members, a plurality of transverse channel members extending between two opposite channel members of said frame and a skin secured to the upper faces of said channel members.

18. A container according to claim 17, in which said second locking means comprises a transverse locking bolt extending through aligned holes in the upper end portions of said corner posts and said sockets of the top member.

19. A container according to claim 17, further comprising a document holder on the inner face of said top member.

20. A container according to claim 19 in which said document holder comprises a channel on said top member, a pair of rectangular plates having one edge portion of each plate received in said channel, said plates having opposite edges adjacent said one edge portion provided with cooperating means for retaining a document between said plates and means releasably securing the fourth edge portion of said plates together and to said top member.

21. A container according to claim 1, in which said top member comprises a rectangular frame and an X-frame extending between opposite sides of said frame.

22. A container according to claim 1, further comprising lifting links in the upper end portions of said corner posts, each said link being movable from a retracted position inside said post to an operative position extending above the top of said post.

23. A container according to claim 1, further comprising aligning means vertically slidably mounted on the sides of said pallet and movable between a retracted position and an operative position in which they project downwardly below said pallet in position to engage side edges of the top of a lower container to hold two containers in alignment when one is stacked on another.

24. A container according to claim 1, in which said pallet further has at its corners downwardly opening sockets receiving the upper end portions of the corner posts of a lower container when one container is stacked on top of another.

25. A container according to claim 24 further comprising locking means releasably securing the pallet of the upper container to the upper end portions of the posts of the lower container.

26. A container according to claim 1 in which said top member comprises an open rectangular frame.

References Cited in the file of this patent

UNITED STATES PATENTS

| | | |
|---|---|---|
| 1,980,944 | Rowe | Nov. 13, 1934 |
| 2,135,567 | Doherty | Nov. 8, 1938 |
| 2,457,842 | Smith et al. | Jan. 4, 1949 |
| 2,664,219 | Schmidt | Dec. 29, 1953 |
| 2,869,750 | Doerr et al. | Jan. 20, 1959 |
| 2,904,297 | Hamilton | Sept. 15, 1959 |
| 2,906,481 | Parker | Sept. 29, 1959 |
| 2,919,826 | Richter | Jan. 5, 1960 |
| 3,001,662 | Herpich | Sept. 26, 1961 |

FOREIGN PATENTS

| | | |
|---|---|---|
| 240,759 | Sweden | Oct. 15, 1949 |